United States Patent Office 3,000,990
Patented Sept. 19, 1961

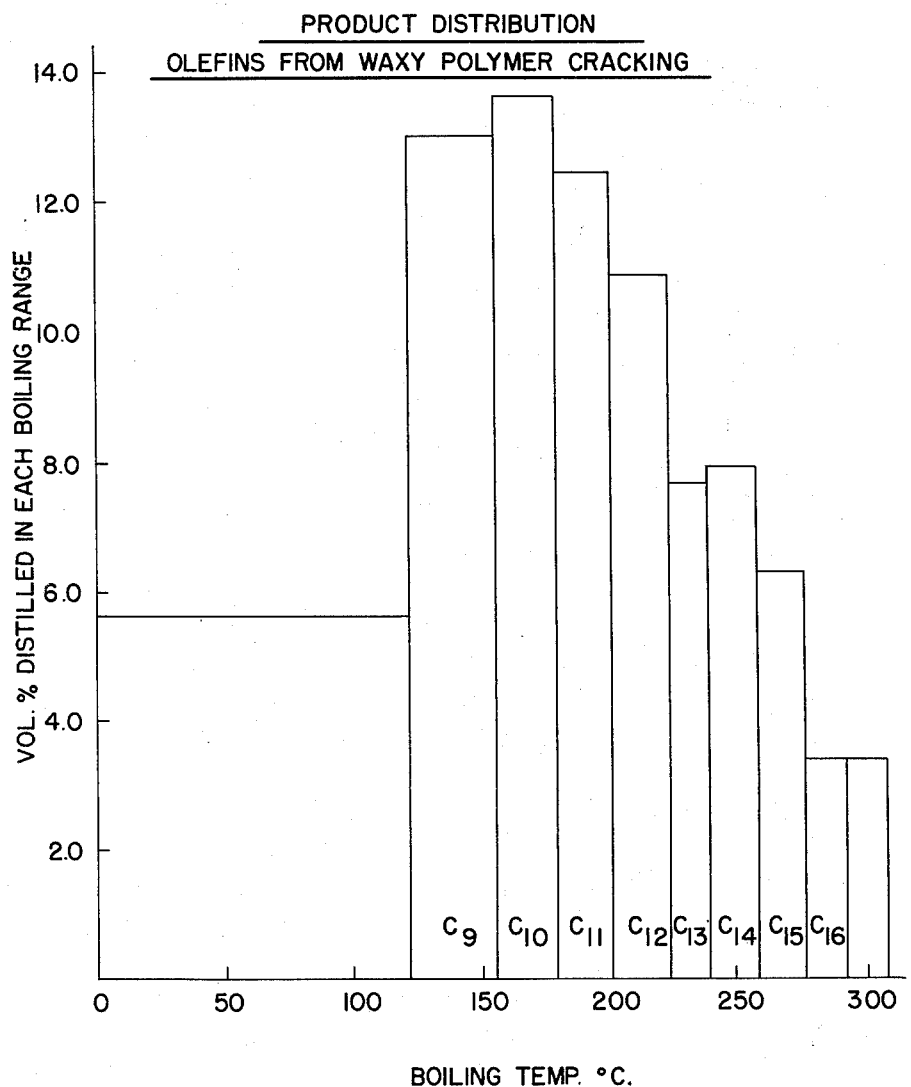

3,000,990
PRODUCTION OF OLEFINS FROM AMORPHOUS LINEAR POLYMERS
Ralph M. Hill, Mountainside, Joseph M. Kelley, Jr., Cranford, and John R. Lovett, Metuchen, N.J., assignors to Esso Research and Engineering Company, a corporation of Delaware
Filed Apr. 27, 1959, Ser. No. 809,007
5 Claims. (Cl. 260—683)

This invention relates to an improved process of preparing desirable olefins. More particularly it relates to a process of this nature wherein predominantly type II and type III olefins in the $C_9$ through $C_{15}$ range are prepared from amorphous, substantially linear polypropylene.

Type II and type III monoolefins in the $C_9$ through $C_{15}$ range are extremely useful as chemical intermediates in the manufacture of detergents, sulfonates, alcohols, esters, acids, etc. It is therefore desirable to develop additional sources of supply of these materials. These types of olefins are characterized by the general formula, where R is an alkyl group.

  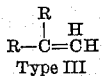
Type II            Type III

It has now surprisingly been found that predominantly type II and type III olefins in the $C_9$ through $C_{15}$ range can be prepared by heating amorphous, substantially linear polypropylene in the presence of a group IV–B compound and an aluminum compound.

The type II and type III olefins comprise about 90 to 95 vol. percent of the total desired product and the $C_9$ through $C_{15}$ materials comprise about 65 to 75 vol. percent of the total product which are principally monoolefins.

The group IV–B compounds and the aluminum compounds utilized are conveniently salts, e.g., zirconium, titanium, or vanadium, and aluminum chlorides, alcoholates, and acetylacetonates. The group IV–B compound and the aluminum compound are utilized in an amount of from 1 to 25 wt. percent of each based on the polymer.

The temperatures utilized are in the range of 250° to 500° C. at ordinary pressures, preferably 275° to 350° C. depending on the product distribution desired.

The amorphous, substantially linear polypropylene utilized has a molecular weight in the range of 1000 to 100,000 (Harris Correlation, J. Polymer Science, 8 361 (1952)). This material is prepared by the low pressure polymerization process described in the literature, e.g. see U.K. Patent 810,023 and "Scientific American," September 1957, pages 98 et seq.

In that process the polymers are prepared by polymerizing the propylene with the aid of certain polymerization catalysts, e.g., see above-mentioned patent. The catalysts are solid, insoluble reaction products obtained by partially reducing a heavy metal compound of groups IV–B, V–B, VI–B of the periodic system such as vanadium tetrachloride, or a titanium halide, e.g. $TiCl_4$, $TiBr_4$, etc., preferably with metallic aluminum. The preferred catalyst of this type is usually prepared by reducing 1 mole of titanium tetrahalide, usually tetrachloride, with about one-third mole of aluminum to give a material corresponding to $TiCl_3 \cdot 0.33\ AlCl_3$, thus containing cocrystallized $AlCl_3$. (For further details see copending U.S. Application Serial No. 578,198, filed April 6, 1956 and Serial No. 766,376, filed October 19, 1958.) The product is then activated with an aluminum alkyl compound corresponding to the formula $RR'AlX$. In this formula R, R' and X preferably are alkyl groups of 2 to 8 carbon atoms, although X may alternatively be hydrogen or a halogen, notably chlorine. Typical examples of the aluminum alkyl compounds are aluminum triethyl, aluminum sesquichloride, aluminum triisobutyl, etc.

The monomer is then contacted with the resulting catalyst in the presence of hydrocarbon solvents such as isopentane, n-heptane, xylene, etc. The polymerization is conveniently effected at temperatures of about 0° to 100° C. and pressures ranging from about 0 to 500 p.s.i.g., usually 0 to 100 p.s.i.g. The catalyst concentration in the polymerization zone is preferably in the range of about 0.1 to 0.5 wt. percent based on total liquid and the polymer product concentration in the polymerization zone is preferably kept between about 2 to 15% based on total contents so as to allow easy handling of the polymerized mixture. The proper polymer concentration can be obtained by having enough of the inert diluent present or by stopping the polymerization short of 100% conversion. When the desired degree of polymerization has been reached, a $C_1$ to $C_8$ alkanol such as isopropyl alcohol or n-butyl alcohol, desirably in combination with a chelating agent, such as acetylacetone, is normally added to the reaction mixture for the purpose of dissolving and deactivating the catalyst and for precipitating the polymer product from solution.

About 40% of the polypropylene is in solution (in xylene) at reactor temperature of 80° C. The waxy or amorphous polymer is obtained by adding methanol or other lower alcohol to an e.g. xylene slurrry of polypropylene and filtering. The waxy polymer is contained in this filtrate and the amount obtained is controlled by the amount of precipitating methanol which is added to the xylene slurry (the higher the methanol-slurry volume ratio, the less waxy polymer is obtained in the filtrate).

The methanol and xylene are removed by suitable means such as vaporization. The waxy polymer can be recovered or treated further to remove titanium and aluminum residues.

The amounts of the metals utilized as catalysts can be adjusted by controlling the deashing procedure or by the addition of extra metal compounds, such as by the addition of liquid $TiCl_4$ or solid $AlCl_3$ to the waxy polymer.

This invention and its advantages will be better understood by reference to the following examples.

*Example I*

55.7 grams of material containing approximately 50 wt. percent of waxy polypropylene polymer and 25 wt. percent each of Ti and Al acetylacetonates was heated to about 300° C. in a round bottom flask equipped with a distillation head and blanketed with a stream of nitrogen. The mixture was maintained at this temperature for about 4 hours and the liquid distilling over was collected. This product was redistilled under vacuum. The distribution of products by carbon number is shown by the graph in the drawing. These data and infrared analysis show that the major proportion of products are type II and type III olefins boiling in the $C_9$ through $C_{15}$ range. 28.5 grams of liquid were obtained in this experiment.

*Example II*

An amorphous, substantially linear polypropylene polymer which differed only in the titanium and aluminum acetylacetonate content was treated in the same manner as in Example I. Little or no titanium and aluminum residues were present in this polymer sample. There was substantially no thermal decomposition and no liquid olefin products could be recovered.

The advantages of this invention will be apparent to those skilled in the art. Valuable monoolefins in controlled amounts are obtained from a product which is normally considered a waste material in the low pressure polymerization operation. By control of cracking severity selectivity can be adjusted to obtain 2 methyl pentene-1 (propylene dimer) which can be isomerized to 2 methyl pentene-2 (an octane blending agent) or 4 methyl pentene-1, a potential fiber intermediate.

The process of this invention can be carried out in a batch or continuous manner. This process is applicable to amorphous, linear polymers other than polypropylene, such as ethylene, butene-1 and ethylene-propylene copolymers.

It is to be understood that this invention is not limited to the specific examples which have been offered merely as illustrations and that modifications may be made without departing from the spirit of the invention.

What is claimed is:

1. A process for preparing monoolefins predominantly of the general formulae

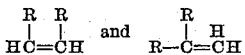

and, where R is an alkyl group, in the $C_9$ through $C_{15}$ range which comprises heating an amorphous, substantially linear polypropylene having a molecular weight in the range of 1000 to 100,000 in the presence of a group IV–B salt and an aluminum salt at a temperature in the range of 250° to 500° C., the group IV–B salt and the aluminum salt each being utilized in an amount of from 1 to 25 wt. percent based on the polypropylene.

2. The process of claim 1 in which the group IV–B salt is a titanium salt.

3. The process of claim 1 in which the group IV–B salt is a zirconium salt.

4. The process of claim 3 in which the titanium salt is titanium acetylacetonate and the aluminum salt is aluminum acetylacetonate.

5. The process of claim 1 in which the temperature utilized is in the range of 275° to 350° C.

References Cited in the file of this patent

UNITED STATES PATENTS 2,552,692    Schultze et al.  ---------- May 15, 1951

FOREIGN PATENTS 533,362    Belgium ---------------- May 16, 1955

OTHER REFERENCES

Emmet: "Catalysis," vol. 6, pp. 432–33, published by Reinhold Publishing Co. (1958).